US008475762B2

(12) United States Patent
Li et al.

(10) Patent No.: US 8,475,762 B2
(45) Date of Patent: Jul. 2, 2013

(54) METHOD AND APPARATUS TO MINIMIZE AIR-SLURRY SEPARATION DURING GYPSUM SLURRY FLOW

(75) Inventors: Alfred Li, Naperville, IL (US); Chris C. Lee, Mt. Prospect, IL (US); Chris Nelson, Lindenhurst, IL (US); Cesar Chan, Libertyville, IL (US); Weixin David Song, Vernon Hills, IL (US)

(73) Assignee: United States Gypsum Company, Chicago, IL (US)

( * ) Notice: Subject to any disclaimer, the term of this patent is extended or adjusted under 35 U.S.C. 154(b) by 47 days.

(21) Appl. No.: 13/151,749

(22) Filed: Jun. 2, 2011

(65) Prior Publication Data

US 2012/0308463 A1 Dec. 6, 2012

(51) Int. Cl.

| | |
|---|---|
| ***B32B 13/00*** | (2006.01) |
| ***B32B 37/00*** | (2006.01) |
| ***B28B 19/00*** | (2006.01) |
| ***B29C 43/22*** | (2006.01) |
| ***B29D 7/00*** | (2006.01) |
| ***B01F 13/02*** | (2006.01) |
| ***C01F 11/46*** | (2006.01) |

(52) U.S. Cl.
USPC ............ 423/555; 156/39; 156/346; 264/45.8; 264/42; 366/101; 366/192

(58) Field of Classification Search
USPC .............. 156/39, 346; 264/45.8, 42; 366/101, 366/192; 423/555
See application file for complete search history.

(56) References Cited

U.S. PATENT DOCUMENTS

| | | | |
|---|---|---|---|
| 1,907,901 | A | 5/1933 | Timpson |
| 2,213,640 | A | 9/1940 | Stone |
| 3,119,704 | A | 1/1964 | Harrell et al. |
| 4,187,066 | A | 2/1980 | Hobson et al. |
| 4,390,281 | A | 6/1983 | Scriminger |
| 5,643,510 | A | 7/1997 | Sucech |
| 5,683,635 | A | 11/1997 | Sucech et al. |
| 6,494,609 | B1 | 12/2002 | Wittbold et al. |
| 6,874,930 | B2 | 4/2005 | Wittbold et al. |
| 7,059,543 | B2 | 6/2006 | Dushkin et al. |

(Continued)

FOREIGN PATENT DOCUMENTS

RU 2199436 2/2003

OTHER PUBLICATIONS

International Search Report from corresponding International Application No. PCT/US2012/038037, dated Aug. 15, 2012.

*Primary Examiner* — Timothy Vanoy
(74) *Attorney, Agent, or Firm* — Greer. Burns & Crain, Ltd.; Pradip Sahu; Phillip T. Petti

(57) ABSTRACT

A method and apparatus for providing an evenly mixed additive enhanced gypsum slurry to a web. Calcined gypsum and water are inserted into a mixer through at least one inlet of the mixer. The contents are agitated to form a slurry. The slurry is passed from an outlet of the mixer into a conduit. An additive is introduced into the slurry along a length of the conduit to achieve a flow stream of a slurry/additive mixture. A cross section of the flow stream is expanded in the conduit while not changing direction of the flow stream and a direction of the flow stream is changed while not expanding the cross section of the flow stream and conduit, all prior to the flow steam exiting from an outlet of the conduit.

16 Claims, 2 Drawing Sheets

U.S. PATENT DOCUMENTS 7,172,403 B2 2/2007 Burke
7,654,807 B2 * 2/2010 Gannaway et al. ........... 425/4 C
7,811,413 B2 10/2010 Hennis et al.
8,016,960 B2 * 9/2011 Wittbold et al. ................ 156/39
2004/0062141 A1 * 4/2004 Shrader et al. ............. 366/155.1
2004/0201120 A1 10/2004 Colbert
2006/0092759 A1 * 5/2006 Petersen et al. ............... 366/192

* cited by examiner

METHOD AND APPARATUS TO MINIMIZE AIR-SLURRY SEPARATION DURING GYPSUM SLURRY FLOW

BACKGROUND OF THE INVENTION

The present invention relates to a method and apparatus for preparing gypsum products (i.e., products comprising calcium sulfate dihydrate) from starting materials comprising calcined gypsum (i.e., calcium sulfate hemihydrate or anhydrite) and water. More particularly, the present invention relates to an improved method and apparatus for use in conjunction with the slurry mixer typically used in supplying agitated gypsum slurry to a wallboard production line. The present apparatus provides an improved conduit leading from the mixer which minimizes air-slurry separation during gypsum slurry flow through the conduit to the outlet.

It is well known to produce gypsum products by uniformly dispersing calcined gypsum in water to form a slurry and then casting the slurry into a desired shaped mold or onto a surface and allowing the slurry to set to form hardened gypsum by reaction of the calcined gypsum (calcium sulfate hemihydrite or anhydrite) with the water to form hydrated gypsum (calcium sulfate dihydrate). It is also well known to produce a lightweight gypsum product by uniformly mixing an aqueous foam into the slurry to produce air bubbles. This will result in a uniform distribution of voids in the set gypsum product if the bubbles do not escape from the slurry before the hardened gypsum forms. The voids lower the density of the final product, which is often referred to as "foamed gypsum."

Prior apparatus and methods for addressing some of the operational problems associated with the production of foamed gypsum are disclosed in commonly-assigned U.S. Pat. Nos. 5,683,635, 5,643,510, 6,494,609 and 6,874,930 which are incorporated by reference. The present invention relates generally to the use of foamed gypsum in the production of gypsum wallboard.

A gypsum wallboard mixer typically includes a housing defining a mixing chamber with inlets for receiving calcined gypsum and water, among other additives well known in the art. The mixer includes an impeller or other type of agitator for agitating the contents to be mixed into a mixture or slurry. Such mixers typically have a rectangular discharge gate or slot with a cutoff block or door. The discharge gate controls the flow of slurry from the mixer, and is difficult to adjust to change slurry flow when product requirements change, such as when thicker or thinner wallboard is desired.

It has been found that it is desirable to reduce the pressure of the slurry in the slurry conduit before the slurry leaves the conduit outlet in order to avoid disrupting the distribution of the previously deposited slurry in a wallboard production line. This is accomplished by providing one or more changes of direction of the conduit between the mixer and the conduit outlet, such as by providing one or more elbows or bends along the length of the conduit and also by enlarging a cross section of the flow stream of slurry in the conduit while at the same time changing the direction of the flow stream. In the known constructions, the enlargement of the flow stream and the changing of the direction of the flow stream take place simultaneously in a boot which comprises a 90 degree elbow that has an increasing diameter throughout the 90 degree bend of the elbow.

When the slurry-foam additive mixture is such that the air content approaches or exceeds 40%, then as the flow stream of the mixture passes through the elbow with the enlarging diameter, there is a significant and undesirable separation of the air from the slurry.

Therefore, it would be an improvement in the art if there were a method and an apparatus that still provided for reducing the pressure of the slurry flow stream via changes of direction of the conduit and increases in the diameter of the flow stream, while reducing the amount of separation of the air from the slurry in the conduit.

SUMMARY OF THE INVENTION

What the inventors have surprisingly discovered is that changing the direction of flow of the flow stream at the same time as enlarging the cross section of the flow stream causes a greater separation of the air from the slurry than if the changing of the direction of the flow stream and enlarging a cross section of the flow stream take place at different times and at different spatial locations.

Accordingly, an unexpected improvement is provided by the present apparatus and method in which a conduit is used to discharge the slurry from the mixer in which the changing of the direction of the flow stream in the conduit and an enlargement of the cross section of the flow stream are both provided, yet at different times and spatial locations.

In an embodiment, a method for providing an evenly mixed additive enhanced gypsum slurry to a web includes inserting calcined gypsum and water into a mixing chamber of a mixer through at least one inlet of the mixing chamber, agitating the contents of the mixing chamber to form a slurry comprising an aqueous dispersion of the calcined gypsum, passing the slurry from an outlet of the mixer into a slurry dispensing apparatus including a conduit, introducing an additive into the slurry at a point along a length of the conduit in the slurry dispensing apparatus to achieve a flow stream of a slurry/additive mixture through the conduit, and expanding a cross section of the flow stream in the conduit while not changing a direction of the flow stream and changing a direction of the flow stream while not expanding the cross section of the flow stream and conduit prior to the flow steam exiting from an outlet of the conduit.

In still another embodiment, an apparatus is configured for connection to a mixer for receiving a gypsum slurry, which includes a conduit having a main inlet in slurry receiving communication with the mixer outlet and extending in a downstream direction to a spout for discharging the slurry, the conduit providing a flow path for a flow stream of the slurry, at least one bend in the conduit to cause a change of direction of the flow stream between the main inlet and the spout, wherein a cross section of the flow stream does not expand in the bend, and at least one expansion section in the conduit to cause an expansion of a cross section of the flow stream between the main inlet and the spout, wherein the flow stream does not change direction in the at least one expansion section.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DETAILED DESCRIPTION OF THE PREFERRED EMBODIMENTS

Figure 1:
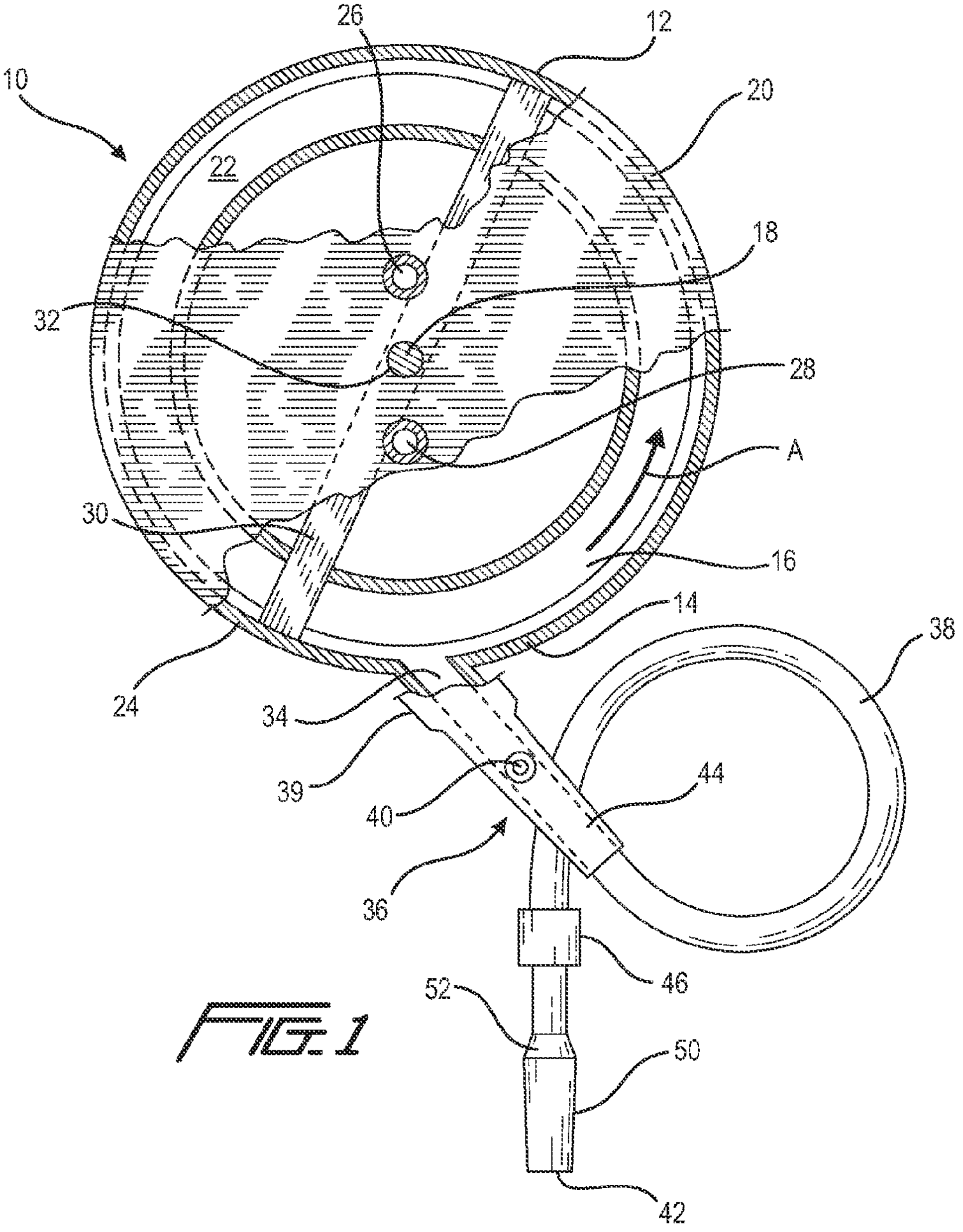
FIG. 1 is a fragmentary schematic overhead plan view of a mixing apparatus incorporating the features of the invention.

Referring now to FIG. 1, a mixing apparatus for mixing and dispensing a slurry is generally designated 10 and includes a mixer 12 having a housing 14 configured for receiving and mixing the slurry. The housing 14 defines a mixing chamber 16 which is preferably generally cylindrical in shape, has a generally vertical axis 18, and upper radial wall 20, a lower radial wall 22 and an annular peripheral wall 24. An inlet 26 for calcined gypsum and an inlet 28 for water are both positioned in the upper radial wall 20 proximate the vertical axis 18. It should be appreciated that the inlets 26, 28 are connected to gypsum and water supply containers respectively (not shown), such that gypsum and water can be supplied to the mixing chamber 16 by simple gravity feed. Also, as is well known in the art, other materials or additives in addition to gypsum and water, often employed in slurries to prepare gypsum products (e.g. accelerators, retarders, fillers, starch, binders, strengtheners, etc.) can also be supplied through these or other inlets similarly positioned.

An agitator 30 is disposed in the mixing chamber 16 and has a generally vertical drive shaft 32 positioned concentrically with the vertical axis 18 and extends through the upper radial wall 20. The shaft 32 is connected to a conventional drive source such as a motor for rotating the shaft at whatever speed is appropriate for agitating the agitator 30 to mix the contents of the mixing chamber 16. Speeds in the range of 275-300 rpm are common. This rotation directs the resulting aqueous slurry in a generally centrifugal direction, such as in a counter-clockwise outward spiral indicated by the arrow A. It should be appreciated that this depiction of an agitator is relatively simplistic and meant only to indicate the basic principles of agitators commonly employed in gypsum slurry mixing chambers known in the art. Alternative agitator designs, including those employing pins or paddles, are contemplated.

An outlet 34, also referred to as a mixer outlet, a discharge gate or a slot, is provided in the peripheral wall 24 for the discharge of a portion comprising more than half of the well-mixed slurry into what is generally referred to herein as a mixing and dispensing apparatus 36. While conventional outlets are typically rectangular in cross-section, the present outlet 34 is preferably circular in cross-section, however other shapes are contemplated depending on the application. Also, while it is contemplated that the specific configuration of the mixer 12 may vary, it is preferred that the present mixer is of the centrifugal type commonly used in the manufacture of gypsum wallboard, and also of the type in which the outlet 34 dispenses the slurry tangentially to the housing 14. While conventional mixers typically provide a cutoff block at the outlet 34 to mechanically adjust the flow of slurry for the desired thickness of wallboard, typically ranging from ¼" to 1", it has been found that such a block often provides a site for the premature setting of gypsum, resulting in slurry buildup and eventual clogging and disruption of the production line.

The mixing and dispensing apparatus 36 includes an elongated, preferably cylindrical tube or conduit 38 and having a main inlet 39 in slurry receiving communication with the mixer outlet 34, and has an additive inlet 40 such as a nipple for the introduction of aqueous foam or other desired additive, such as retarders, accelerators, dispersants, starch, binders, and strength-enhancing products such as poly-phosphates, typically sodium trimetaphosphate, all of which are known in the wallboard art, after the slurry has been substantially mixed. It is desired that when foam is the additive, it is uniformly mixed in the slurry but not excessively agitated to the extent that it is broken down. As such, it is common to introduce the foam into the additive inlet 40 just after or downstream of, yet close to the outlet 34 and the main inlet 39 to prolong mixing time with the slurry. However, depending on the particular application, it is contemplated that the additive such as foam may be introduced at other places along the apparatus 36.

It is preferred that the length of the mixing and dispensing apparatus 36 be in the range of at least 48 inches (120 cm), however it is contemplated that the length may vary depending on the particular application and the constraints of the particular gypsum wallboard production line. The extended length of the mixing and dispensing apparatus 36 is desirable for providing time for the foam to mix uniformly with the slurry after the point of additive introduction, and prior to dispensing the slurry upon a wallboard forming area such as the web of wallboard paper or upon a previously dispensed layer of relatively denser gypsum slurry, also deposited upon a web of wallboard paper. Since the preferred application for the present invention is a gypsum wallboard production line, the gypsum slurry with additives is commonly dispensed or discharged upon such a web.

A feature of the present mixing apparatus 10 is that the conduit 38 is placed in fluid communication with the outlet 34 upstream from the introduction of foam at the inlet 40, and includes a discharge spout 42 for dispensing the slurry upon the web as described above. The conduit 38 is preferably a flexible hose of rubber or rubber-like material (although rigid conduits are contemplated) and is of sufficient length to provide extra time for the foam or other additive to become more uniformly mixed within the slurry. While rigid conduits are also contemplated, best results have been obtained using hoses which are double reinforced to avoid kinking, preferably having a smooth inner surface, and being dimensioned in the range of 1 ½-3 inches (3.75-7.5 cm) inner diameter. Other diameters are contemplated to suit the application. In the present invention, a preferably relatively rigid additive inlet portion 44 bearing the inlet nipple 40 is in the approximate range of 6-24 inches (15-60 cm), and with the preferably flexible hose piece conduit, has a total length at least in the approximate range of 50 to 168 inches (125-420 cm), while longer lengths are contemplated, such as when increased slurry residence time is desired for more complete mixing. It is contemplated that in some applications, the additive inlet portion 44 is also made of flexible, rubber-like material and is in the shape of a hose. When the additive inlet portion 44 and the conduit 38 are made of dissimilar materials, they are joined to each other with adhesives, clamps, ultrasonic welding or other known fastening technologies in a way which will provide a smooth transition and which minimizes internal obstructions which might provide a site for the collection and premature setting of slurry.

A drawback of conventional gypsum slurry mixing apparatuses is that a canister is often used downstream of the discharge gate to reduce the slurry pressure. Another goal of the present invention is to eliminate the canister and its inherent problems. Accordingly, the present mixing and dispensing apparatus 36 is configured to maintain a generally smooth flow of the slurry from the main inlet 39 to the discharge spout 42 without a flow disrupter in the nature of the prior canisters. Sufficient mixing action of the additive with the slurry occurs without the need for any additional energy or force being applied to the slurry or additive in the conduit 38 through which they pass. This is in contrast to an undeterministic nature of the flow through the prior canisters, in which uneven mixing of additives and slurry often occurred.

The flexibility of the present mixing and dispensing apparatus 36, and specifically the conduit 38 permits coiled or serpentine configurations that extend the length of the mixing chamber 16, and thus increase the residence time in which the foam and/or other additive can complete its mixing with the slurry without requiring a longer production line. Unlike conventional wallboard mixing apparatuses, in the present invention the conduit 38 of the mixing and dispensing apparatus 36 is directly connected to the gate portion 44, and ultimately to the outlet 34 without intervening devices such as a canister. Also, the preferably flexible construction of at least a portion of the conduit 38 reduces the tendency for gypsum to prematurely set up in the interior and cause undesirable clogging.

Another feature provided in some embodiments of the present mixing apparatus 10 is at least one conduit restrictor or flow restrictor 46 associated with the mixing and dispensing apparatus 36 for creating back pressure in the gate and ultimately in the mixing chamber 16, for controlling the flow of slurry from the spout 42 and for at least reducing and generally preventing the buildup of slurry in the gate and the mixer. In the preferred embodiment, the restrictor 46 is of the type which; exerts an even, circular or concentric clamping force on the flexible conduit 38. Also, the preferred restrictor 46 exerts its clamping force on the exterior of the conduit 38, so that an internal passageway of the conduit is not obstructed by valve components.

The preferred restrictor 46 is a dynamically adjustable valve, i.e., is adjustable while the mixer 12 is in operation and slurry is being emitted from the spout 42, and is taken from the group consisting of pinch valves, muscle valves, concentric valves, iris-action valves and butterfly valves. In some low-pressure applications, simple hose clamps are also suitable. It is contemplated to use a transition between a larger diameter hose to a smaller diameter hose section as the restrictor 46 for reducing the volume of dispensed slurry, and for creating backpressure. For best results, the valve 46 is located on the conduit 38 near the spout 42 to provide the most efficient use of the length of the conduit for complete mixing of the foam into the slurry, however other locations farther from the spout are contemplated depending on the application.

Figure 2:
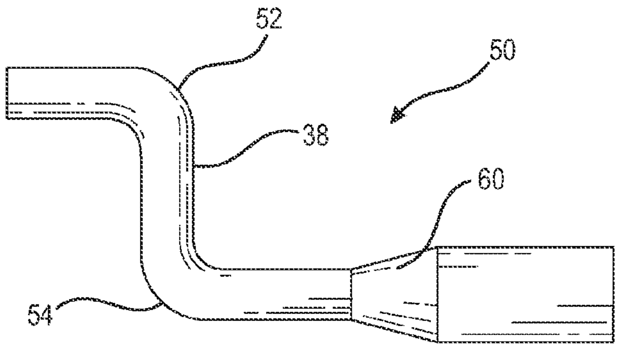
FIG. 2 is a side elevational view of a first embodiment of the pressure reducing apparatus of FIG. 1 shown in isolation.
Figure 3:
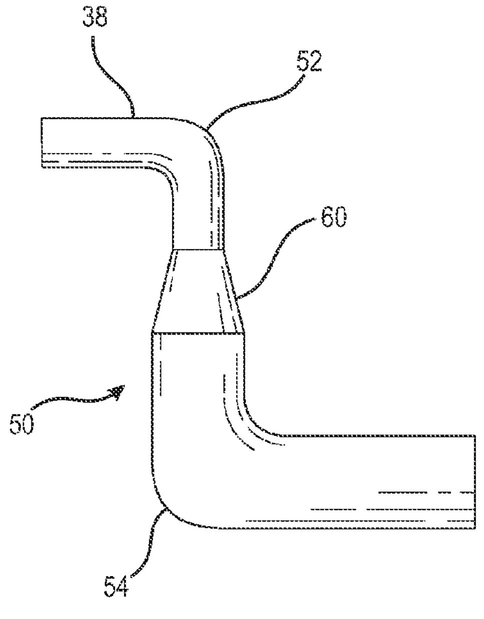
FIG. 3 is a side elevational view of a second embodiment of the pressure reducing apparatus of FIG. 1 shown in isolation.

Referring now to FIGS. 1-3, a further feature of the present mixing apparatus 10 is a pressure reducing apparatus or pressure reducer, shown generally at 50, in the mixing and dispensing apparatus 36 for reducing the pressure or force of the slurry being dispensed from the spout 42. A typical mixer 12 of the type used with the present invention generates a slurry velocity in the approximate range of 700-2200 ft/min, measured at the discharge gate or outlet 34 with a correspondingly high force or pressure. Unless this force or pressure is reduced significantly, the force of the output from the spout 42 will disrupt the distribution of the previously deposited slurry, causing the above-described "washout," and will result in uneven wallboard. Thus, the pressure reducer 50 is needed so that the discharge from the spout 42 is acceptably slow and even.

In the preferred embodiment, the pressure reducer 50 is disposed in close association with the spout 42 and generally defines at least one and perhaps two or more bends 52, 54 in the conduit 38. The bends may each be in the range of 30 to 90 degrees and the radius of the bends may be relatively tight, such as not greater than a diameter of the conduit. The objective of the bends 52, 54 is to cause the flow of slurry in the conduit 38 to undergo at least one and perhaps at least two deflections (which may be approximately right angle deflections) prior to exiting the spout 42. It has been determined that it is important that the diameter of the conduit at the bends be constant, and not expanding. Each successive deflection will further reduce the output pressure of the slurry measured at the spout 42. It has also been found that positioning the conduit 38 to have an upwardly extending portion causes gravitational forces to reduce the pressure of the slurry.

As seen in FIGS. 2 and 3, the pressure reducer 50 also includes an expanding portion 60 in which a cross sectional area of the flow stream of the slurry increases as the flow stream passes through this expanding portion. In this portion of the pressure reducer, it is important that the direction of flow of the flow stream not change, or at least that it not change significantly or abruptly.

FIG. 2 shows a first embodiment of the pressure reducer 50 in isolation where the bend 54 precedes the expanding portion 60 in the flow direction. In this embodiment, the bend 54 is located upstream of the expanding portion 60. FIG. 3 shows a second embodiment of the pressure reducer 50 in isolation and shows the expanding portion 60 preceding the bend 54 in the flow direction. That is, the expanding portion 60 is located upstream of the bend 54.

Figure 4:
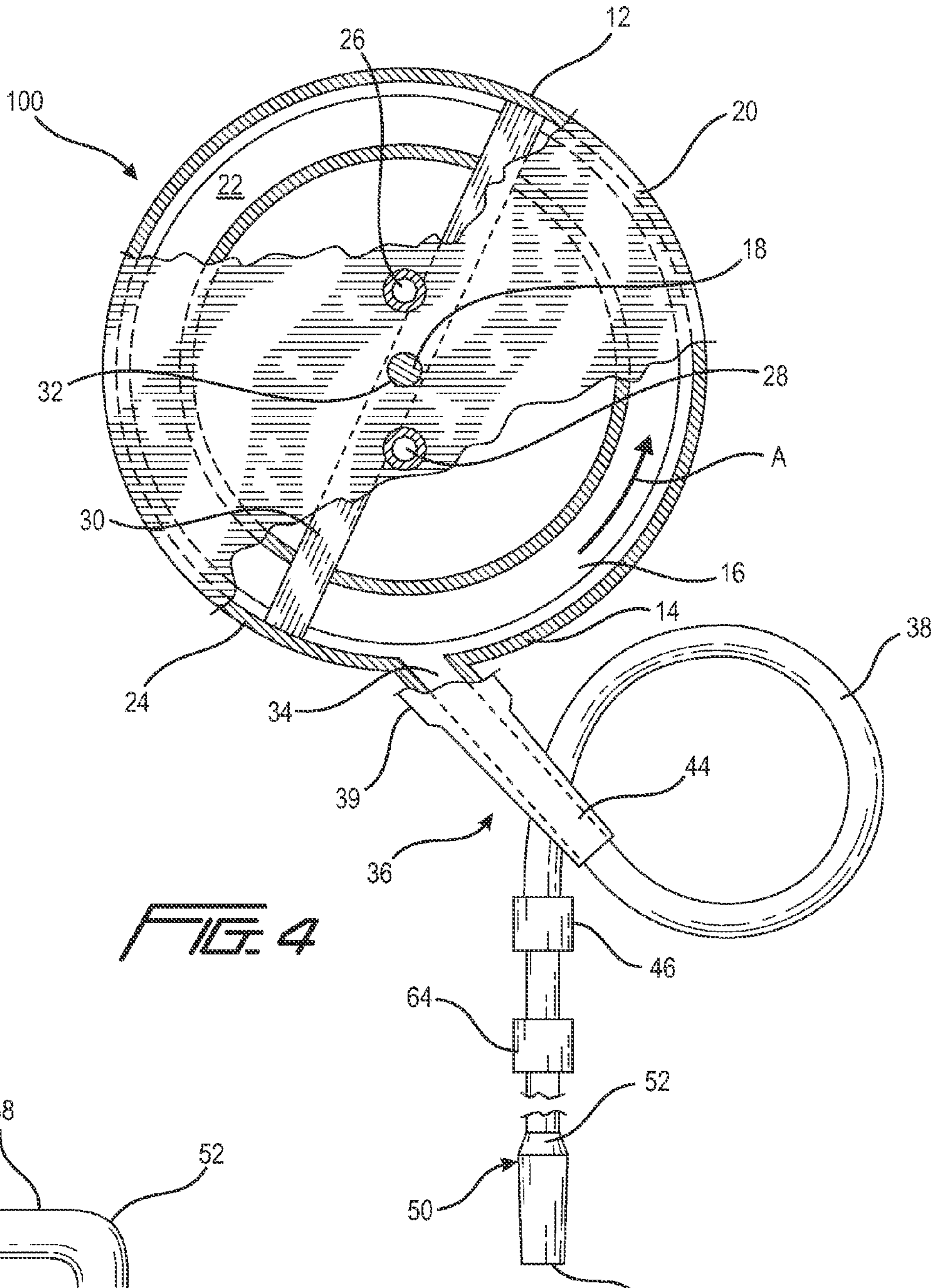
FIG. 4 is a fragmentary schematic overhead plan view of an alternate embodiment of the mixing apparatus of FIG. 1.

Referring now to FIG. 4 an alternate embodiment of the mixing apparatus 10 is designated 100. Components of the apparatus 100 which are shared with the apparatus 10 are designated with the same reference numbers. The main distinguishing feature of the apparatus 100 is that the additive inlet is moved from its former location 40 near the mixer outlet 34 and is preferably provided in the form of a foam injection block 64. The block 64 is located downstream of the valve 46, or between the valve and the spout 42. The purpose of this placement is to address the potential, in some applications, for the foam additive to be used in excessive amounts, or to prematurely break down upon the application of backpressure by the conduit restrictor 46.

By introducing the foam after the backpressure has been created by the conduit restrictor 46, the destructive forces acting on the foam will be reduced. However, to promote even distribution of the foam or other additive in the slurry between the restrictor 46 and the spout 42, there must be sufficient length provided to the conduit 38 in this region to provide adequate blending time, otherwise known as a slurry travel distance, which is sufficient to promote satisfactory foam or other additive blending in the slurry. The length of the conduit 38 in this region will vary with the application.

In operation, it will be seen that a system for providing an evenly mixed slurry to a web is provided, including inserting calcined gypsum and water into the mixing chamber 16 through one or more inlets 26, 28 of the mixing chamber, agitating the contents of the mixing chamber to form an aqueous dispersion of the calcined gypsum, emitting the agitated contents from the outlet 34 of the mixer 12, passing the agitated contents into the main inlet 39 of the mixing and dispensing apparatus 36, 36*a-e*, introducing an aqueous foam into the mixture at the gate, preferably through the inlet nipple 40, creating a back pressure on the mixture in the gate by constricting the area of mixture being emitted from the flexible conduit 38, 38*a-e* of the gate, the back pressure being created by constricting the conduit 38, such as with the valve 46, and controlling the pressure of slurry and additive dispensed from the spout 42, 42*c*, 42*e* such as by the pressure reducer 50 in its various configurations. In the preferred embodiment, the slurry pressure is reduced by being forced to change direction approximately 90 degrees at least once and perhaps twice or more. The cross sectional area of the slurry flow stream is also enlarged as the flow stream moves through the conduit, however, the change of direction of the flow stream and the expansion of the cross section of the flow stream should occur at different times and spatial locations along the conduit.

Where possible, the flexible conduit 38 extends generally directly down the board line. It is contemplated that the conduit 38 may extend linearly at least as much as 60 inches (150 cm) past the mixer 12. The benefits of improved foam/slurry mixing achieved by the present invention include: reduction and/or elimination of blisters in the board; uniformity of the board, leading to improved strength; and potential water reduction from the board formulation, which in turn will led to energy savings in the kiln or an increase in line speed.

While specific embodiments of the slurry conduit of the present invention have been shown and described, it will be appreciated by those skilled in the art that changes and modifications may be made thereto without departing from the invention in its broader aspects and as set forth in the following claims.

The invention claimed is:

1. A method of providing an evenly mixed additive enhanced gypsum slurry to a web, comprising:

inserting calcined gypsum and water into a mixing chamber of a mixer through at least one inlet of the mixing chamber;

agitating the contents of the mixing chamber to form a slurry comprising an aqueous dispersion of the calcined gypsum;

passing the slurry from an outlet of the mixer into a slurry dispensing apparatus including a conduit;

introducing an additive into the slurry at a point along a length of the conduit in the slurry dispensing apparatus to achieve a flow stream of a slurry/additive mixture through the conduit;

changing a direction of the flow stream while not changing a cross section of the flow stream, and thereafter, directing the flow stream through a linear leg of the conduit without changing a cross section of the flow stream or a direction of the flow stream, and thereafter, changing a direction of the flow stream while not changing a cross section of the flow stream, and thereafter expanding a cross section of the flow stream in the conduit while not changing a direction of the flow stream, all prior to the flow steam exiting from an outlet of the conduit.

2. The method of claim 1, further including maintaining a generally smooth flow of the slurry in the slurry dispensing apparatus from a point of introduction of the additive to the outlet of the conduit.

3. The method of claim 1, wherein the changing of the direction of the flow stream comprises a change of direction in the range of 30 to 90 degrees.

4. The method of claim 3, wherein the change of direction comprises approximately 90 degrees.

5. The method of claim 1, wherein the additive comprises a foam with an air content.

6. An apparatus configured for connection to a mixer for receiving a gypsum slurry, said apparatus comprising:

a conduit having a main inlet in slurry receiving communication with the mixer outlet and extending in a downstream direction to a spout for discharging the slurry, said conduit providing a flow path for a flow stream of the slurry;

two spaced apart bends in said conduit to cause a change of direction of said flow stream between said main inlet and said spout, wherein a cross section of the flow stream does not expand in the bends;

a linear section of said conduit extending between the two bends, wherein the cross section of the flow stream does not expand in the linear section, and at least one expansion section in said conduit to cause an expansion of a cross section of said flow stream between downstream one of the two bends and said spout, wherein the flow stream does not change direction in the at least one expansion section.

7. The apparatus according to claim 6, wherein said conduit has at least one inlet between the main inlet and the discharge spout for receiving at least one additive, and is of sufficient length for obtaining uniform mixing of the at least one additive with the slurry prior to dispensing of the slurry from the spout.

8. The apparatus according to claim 6, wherein each of the two bends is in the range of 30 to 90 degrees.

9. The apparatus according to claim 8, wherein each of the two bends is approximately 90 degrees.

10. A method of providing an evenly mixed additive enhanced gypsum slurry to a web, comprising:

inserting calcined gypsum and water into a mixing chamber of a mixer through at least one inlet of the mixing chamber;

agitating the contents of the mixing chamber to form a slurry comprising an aqueous dispersion of the calcined gypsum;

passing the slurry from an outlet of the mixer into a slurry dispensing apparatus including a conduit;

introducing an additive into the slurry at a point along a length of the conduit in the slurry dispensing apparatus to achieve a flow stream of a slurry/additive mixture through the conduit; and changing a direction of the flow stream while not changing a cross section of the flow stream, and thereafter, directing the flow stream through a linear leg of the conduit without changing a cross section of the flow stream or a direction of the flow stream, and thereafter, expanding a cross section of the flow stream without changing a direction of the flow stream, and thereafter changing a direction of the flow stream while not changing a cross section of the flow stream, all prior to the flow steam exiting from an outlet of the conduit.

11. The method of claim 10, wherein the changing of the direction of the flow stream comprises a change of direction in the range of 30 o 90 degrees.

12. The method of claim 11, wherein the change of direction is approximately 90 degrees.

13. An apparatus configured for connection to a mixer for receiving a gypsum slurry, said apparatus comprising:

a conduit having a main inlet in slurry receiving communication with the mixer outlet and extending in a downstream direction to a spout for discharging the slurry, said conduit providing a flow path for a flow stream of the slurry;

a first bend in said conduit to cause a change of direction of said flow stream between said main inlet and said spout, wherein a cross section of the flow stream does not expand in the bend;

a linear segment in said conduit between said first bend and said spout, wherein a cross section of the flow stream does not expand in the linear segment;

at least one expansion section in said conduit to cause an expansion of a cross section of said flow stream between said linear segment and said spout, wherein the flow stream does not change direction in the at least one expansion section; and a second bend in said conduit to cause a change of direction of said flow stream between said expansion section and said spout, wherein a cross section of the flow stream does not expand in the bend.

14. The apparatus according to claim 13, wherein said conduit has at least one inlet between the main inlet and the discharge spout for receiving at least one additive, and is of sufficient length for obtaining uniform mixing of the at least one additive with the slurry prior to dispensing of the slurry from the spout.

15. The apparatus according to claim 13, wherein each of the two bends is in the range of 30 to 90 degrees.

16. The apparatus according to claim 15, wherein each of the two bends is approximately 90 degrees.

* * * * *

UNITED STATES PATENT AND TRADEMARK OFFICE

CERTIFICATE OF CORRECTION

PATENT NO. : 8,475,762 B2
APPLICATION NO. : 13/151749
DATED : July 2, 2013
INVENTOR(S) : Li et al.

It is certified that error appears in the above-identified patent and that said Letters Patent is hereby corrected as shown below:

IN THE CLAIMS:

In Column 7, Line 45 of the issued patent, please delete “steam” and replace with --stream--

In Column 8, Line 42 of the issued patent, please delete “steam” and replace with --stream--

Signed and Sealed this
Eighteenth Day of August, 2015

Michelle K. Lee
*Director of the United States Patent and Trademark Office*